(12) United States Patent
Shieh et al.

(10) Patent No.: US 7,202,788 B2
(45) Date of Patent: Apr. 10, 2007

(54) RFID ELECTRONIC SEAL AND SYSTEM USING THE RFID ELECTRONIC SEAL

(75) Inventors: Yeng-Bao Shieh, Kaohsiung (TW); Sung-Tsun Shih, Neausong Shiang (TW)

(73) Assignee: Yeng-Bao Shieh, Kaohsiung (TW)

( * ) Notice: Subject to any disclaimer, the term of this patent is extended or adjusted under 35 U.S.C. 154(b) by 81 days.

(21) Appl. No.: 10/970,258

(22) Filed: Oct. 21, 2004

(65) Prior Publication Data

US 2006/0087431 A1    Apr. 27, 2006

(51) Int. Cl.
*G08B 13/14* (2006.01)
(52) U.S. Cl. .............................. 340/572.1; 340/572.5; 340/572.8
(58) Field of Classification Search ............. 340/572.1, 340/572.5, 572.8, 572.9; 24/16 PB, 17 AP
See application file for complete search history.

(56) References Cited

U.S. PATENT DOCUMENTS

| | | | | | |
|---|---|---|---|---|---|
| 4,506,415 | A | * | 3/1985 | Swift | ........................ 24/16 PB |
| 5,377,388 | A | * | 1/1995 | DeBever | .................... 24/16 PB |
| 5,387,250 | A | * | 2/1995 | Solbeck | ..................... 24/16 PB |
| 5,969,613 | A | * | 10/1999 | Yeager et al. | ............ 340/572.9 |
| 6,025,781 | A | * | 2/2000 | Deschenes | ................ 340/572.8 |
| 6,147,606 | A | * | 11/2000 | Duan | ....................... 340/572.7 |
| 6,943,678 | B2 | * | 9/2005 | Muirhead | .................... 340/505 |
| 6,976,719 | B2 | * | 12/2005 | Agayof et al. | .............. 294/150 |
| 7,005,989 | B2 | * | 2/2006 | Benoit et al. | ............. 340/572.5 |

* cited by examiner

*Primary Examiner*—John Tweel, Jr.
(74) *Attorney, Agent, or Firm*—Alan D. Kamrath; Nikolai & Mersereau, P.A.

(57) ABSTRACT

An RFID electronic seal includes a head and a strap. A through-hole extends from a first side through a second side of the head. The strap includes an end extending from the first side of the head. A tag is embedded in the head or the strap. A signal-transmitting line is embedded in at least one of the head and the strap and extends from the tag. The strap is extendable through the through-hole of the head along a tightening direction, forming a tightening space, with an engaging member on the strap engaging with another engaging member on the head to prevent the strap from moving in an unfastening direction. The electronic seal can be used in a tracking system that allows a cargo or goods owner to notice breakage of the electronic seal in real time.

23 Claims, 14 Drawing Sheets

RFID ELECTRONIC SEAL AND SYSTEM USING THE RFID ELECTRONIC SEAL

BACKGROUND OF THE INVENTION

1. Field of the Invention

The present invention relates to an electronic seal. In particular, the present invention relates to an RFID electronic seal. The present invention also relates to a system using the RFID electronic seal for tracking cargo.

2. Description of the Related Art

To fulfill the demand of logistics, the goods after being manufactured are put into the supply chain. The most important information to both the supplier and the customer is the location of the goods in the supply chain management. Current cargo tracking systems use an IC (integrated circuit) card and GPS (global positioning system) or mobile phone system to monitor the location of the cargo truck, providing the cargo owner with the information of the number of the license plate of the cargo truck, the code number of the cargo container, the current location of the cargo truck, etc. It is, however, impossible to know whether the cargo container is opened and/or the cargo in the cargo container is stolen or switched, or to prevent such events.

RFID (radio frequency identification) electronic seals are proposed to solve the above problems. A typical electronic seal has a structure similar to a combination lock to seal the rear door of a cargo truck, allowing the owner of the cargo to acquire the required information. The owner will notice in real time after unauthorized breakage of the RFID electronic seal. An active type electronic seal (e.g., SaviTag 654 manufactured by Savi Technology Inc. of California) comprises a battery unit for transmitting signals through antennae. The transmitting distance of the active type electronic seal is about 50 meters, which is much longer than that of a passive type. However, the cost of the active type electronic seal is relatively high. Further, to provide real-time monitoring, the active type electronic seal is mounted to the rear door of a cargo truck that has a cab in which a reader is mounted, with the reader being connected to GPS or a mobile phone system. Transmission of the signals from the rear of the cargo container to the reader in the cab is interfered by the cargo container made of metal. A solution to this problem is to install readers along the route along which the cargo truck moves, resulting in a considerable expenditure. A passive type RFID electronic seal, though cheaper, has a small transmission distance and also fails to overcome the interference from the metal cargo container when used on a cargo truck.

SUMMARY OF THE INVENTION

An objective of the present invention is to provide a low-cost and reliable RFID electronic seal that provides evidence once broken by an unauthorized person.

Another objective of the present invention is to provide a reliable RFID electronic seal for sealing a cargo container or for tightening other goods.

A further objective of the present invention is to provide a reliable tracking system using an RFID electronic seal so that the owner of a cargo or goods can be aware of the position of the cargo or goods carrier and status of the cargo or goods as well as breakage of the RIFD electronic seal in real time.

In accordance with an aspect of the invention, an RFID electronic seal comprises a head and a strap. The head includes a first side and a second side facing away from the first side. A through-hole extends from the first side through the second side of the head. The head further includes a first engaging member.

The strap includes a first end extending from the first side of the head and a second end. The strap includes a second engaging member. A tag is embedded in one of the head and the strap. An antenna is embedded in at least one of the tag and the strap and extends from the tag.

The strap is extendable through the through-hole of the head along a tightening direction, forming a tightening space, with the first engaging member engaging with the second engaging member to prevent the strap from moving in an unfastening direction reverse to the tightening direction.

In an embodiment of the invention, the tag is embedded in the head. The antenna extends from the tag through the first end of the strap to the second end of the strap.

In another embodiment of the invention, the tag is embedded in the strap and adjacent to the second end of the strap.

In an embodiment of the invention, the second engaging member of the strap includes a plurality of teeth in a face of the strap. The first engaging member includes a tongue extending from a wall delimiting the through-hole. The tongue includes a plurality of teeth in a side of the tongue that faces away from the wall from which the tongue extends.

The strap may further include at least one positioning member on at least one of two lateral sides of the strap. At least one of another two mutually facing walls delimiting the through-hole of the head may include at least one positioning groove. The positioning member is positioned in one of the positioning groove and the second side of the head.

In an embodiment of the invention, at least one of another two mutually facing walls delimiting the through-hole of the head includes a recess or protrusion to form said at least one positioning groove.

The positioning member includes an arcuate face to allow smooth movement of the strap along the tightening direction and to prevent the strap from moving along the unfastening direction.

Preferably, the antenna extends helically in the perimeter wall delimiting the through-hole of the head. The antenna may include a connector coupled to a distal end thereof.

In another embodiment of the invention, the strap includes at least one positioning groove in at least one of two lateral sides of the strap. At least one of two mutually facing walls delimiting the through-hole of the strap includes at least one positioning member for engaging with the positioning groove.

In accordance with another aspect of the invention, a tracking system comprises a carrier for carrying a cargo or goods, an RFID electronic seal for sealing the cargo or tightening the goods, a reader mounted on the carrier and located within an effective transmission range of the antenna of the RFID electronic seal, a monitoring station, and a transmitter electrically connected to the reader for transmitting data from the tag to the monitoring station.

The RFID electronic seal comprises a head and a strap. The head comprises a first side and a second side facing away from the first side. A through-hole extends from the first side through the second side of the head. The head further includes a first engaging member.

The strap includes a first end extending from the first side of the head and a second end. The strap includes a second engaging member. A tag is embedded in the head. An antenna is embedded in the head and the strap and extends from the tag through the first end of the strap to the second end of the strap.

The strap is extendable through the through-hole of the head along a tightening direction, forming a tightening space, with the first engaging member engaging with the second engaging member to prevent the strap from moving in an unfastening direction reverse to the tightening direction.

The antenna transmits data to the reader via wire or wireless transmission. The reader and the transmitter may be incorporated as a single unit. The transmitter is one of a transmitter for global positioning system, a personal digital assistant, and a cellular phone of a mobile phone system. The transmitter may transmit information containing location of the carrier to the monitoring station. The tracking system may further include a client-end monitor connected to at least one of the transmitter and the monitoring station.

Other objectives, advantages, and novel features of the invention will become more apparent from the following detailed description when taken in conjunction with the accompanying drawings.

DETAILED DESCRIPTION OF THE PREFERRED EMBODIMENTS

Figure 1:
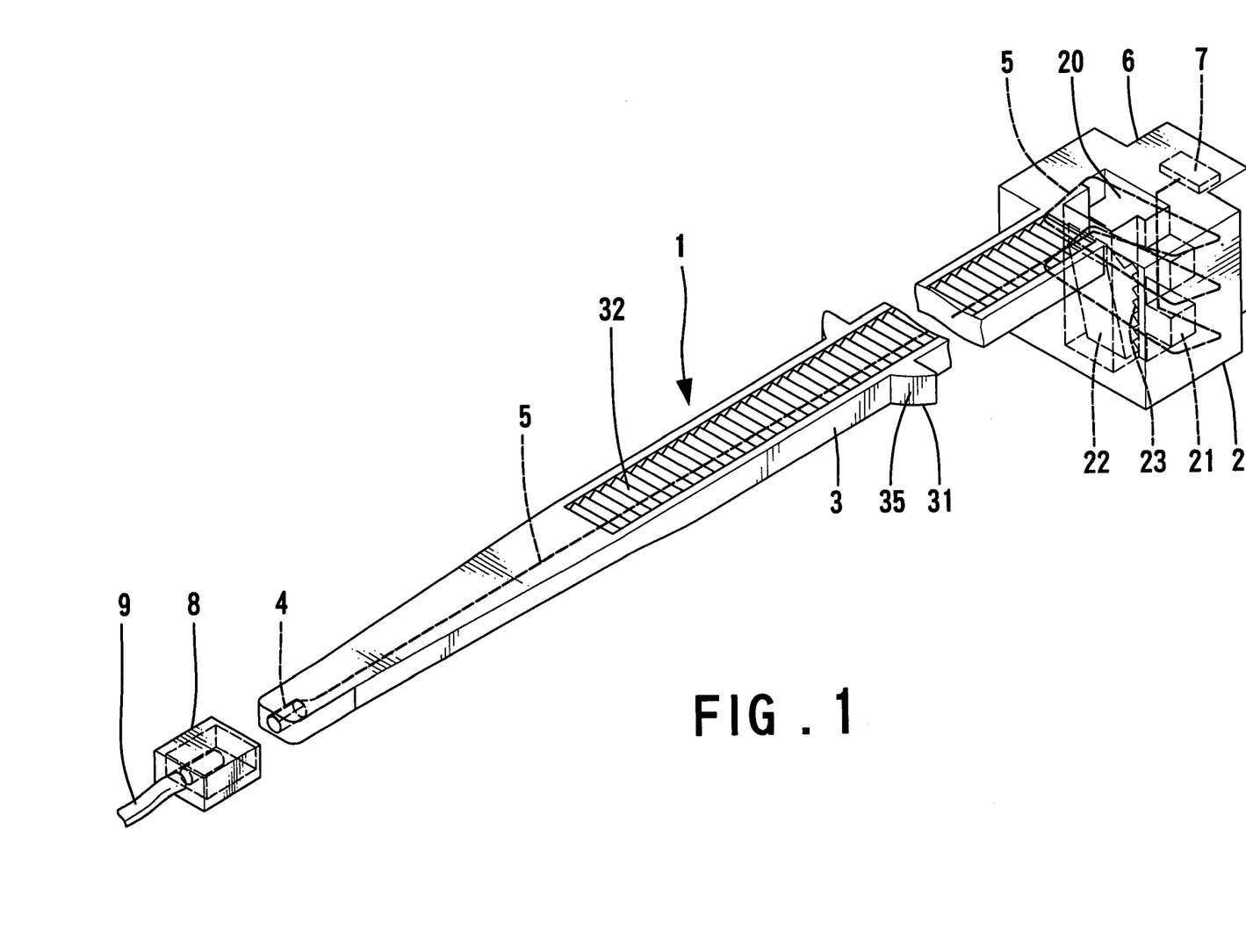
FIG. 1 is a perspective view of an embodiment of an RFID electronic seal in accordance with the present invention.
Figure 2:
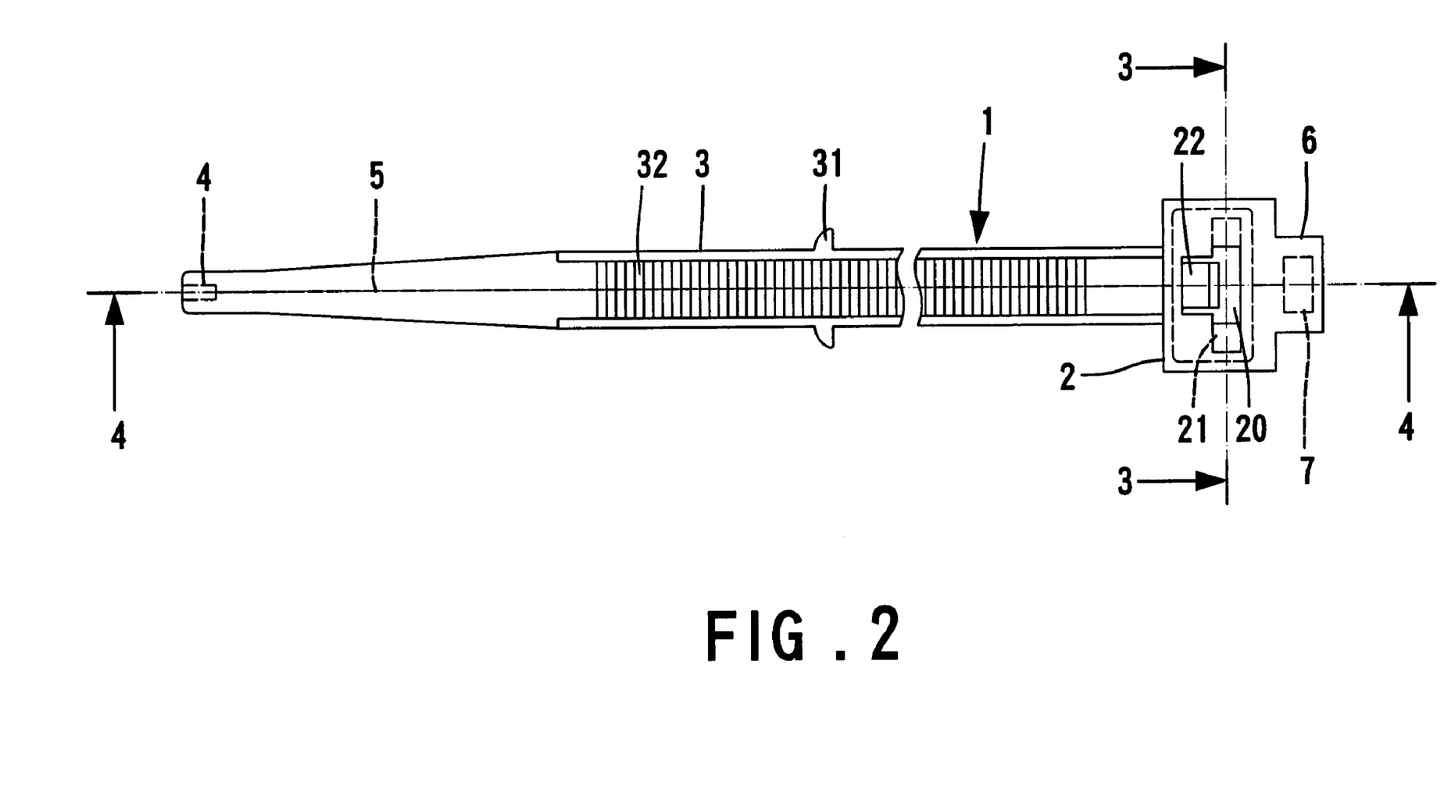
FIG. 2 is a top view of the RFID electronic seal in FIG. 1.

Referring to FIGS. 1 and 2, an RFID electronic seal 1 of an embodiment of in accordance with the present invention comprises a head 2 and a strap 3 including a first end extending from a first end of the head 2. A protrusion 6 projects from a second end of the head 2 that faces away from the first end of the head 2. A through-hole 20 extends from a first side of the head 2 through a second side of the head 2. A tag (or transponder) 7 is embedded in the protrusion 6.

Figure 8:
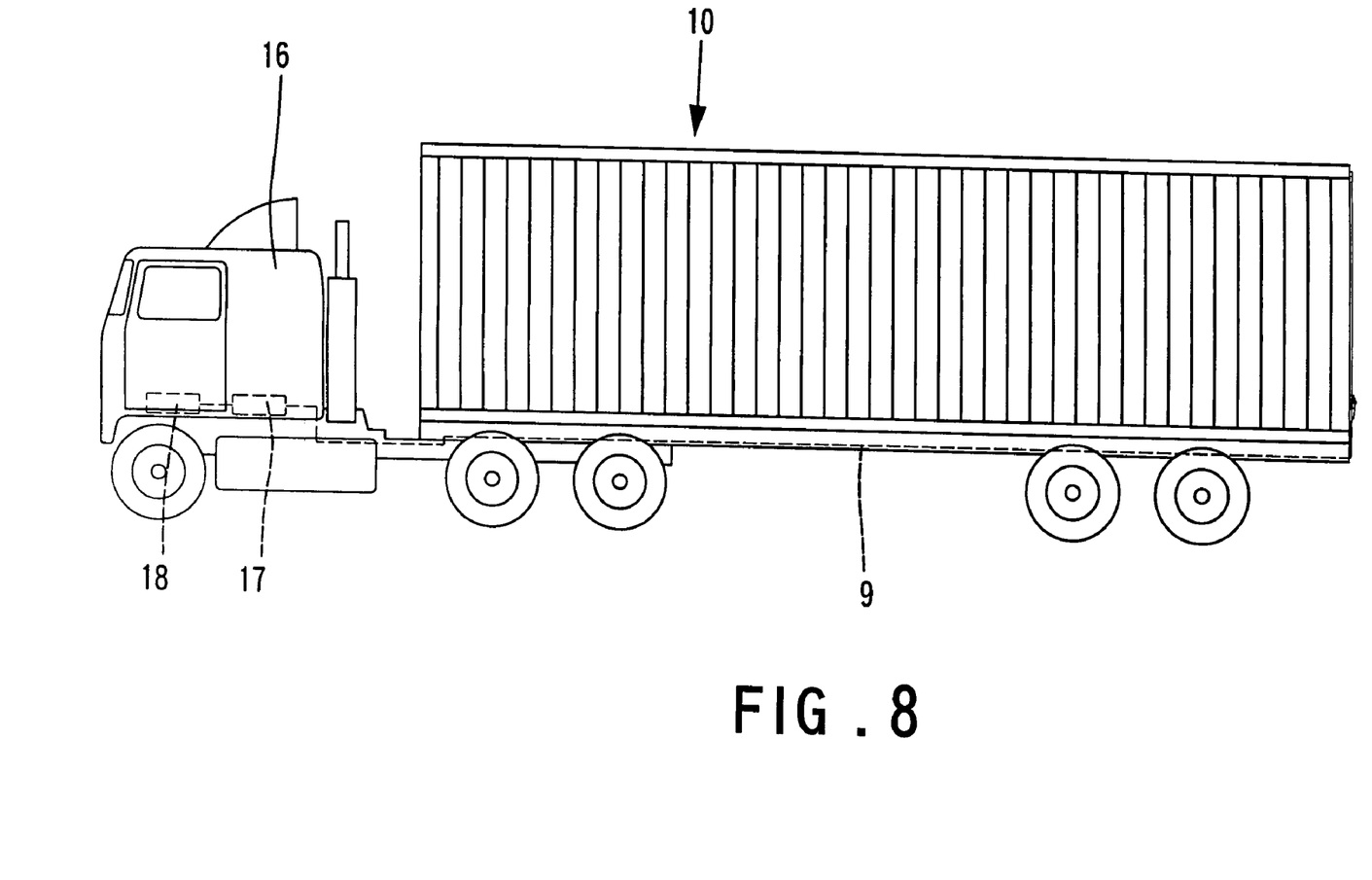
FIG. 8 is a schematic side view of the cargo truck sealed with the RFID electronic seal in accordance with the present invention.

A signal transmitting line 5 extends from the tag 7 to the first end of the strap 3. Further, the signal-transmitting line 5 extends in the strap 3 along a length of the strap 3 to a second end of the strap 3. In this embodiment, a distal end of the signal-transmitting line 5 is coupled with a coupler or connector 4 at the second end of the strap 3 for connecting with a coupler 8 that is electrically connected via a wire 9 to a reader 17 (FIG. 8). In a example, the signal-transmitting line is a signal line. Alternatively, the connector 4 can be omitted, and the signal-transmitting line 5 is an antenna that transmits data to the reader via wireless transmission.

Figure 3:
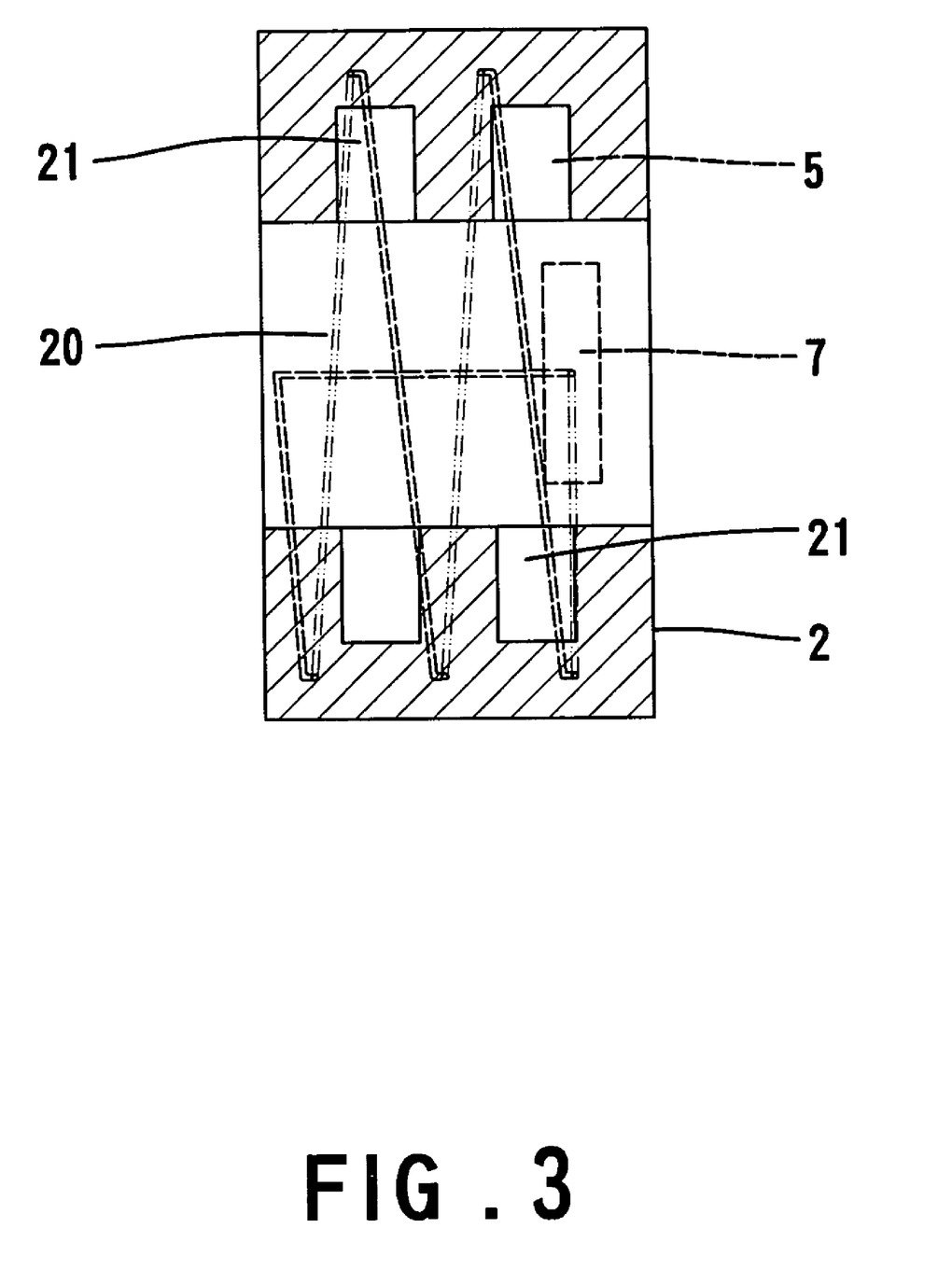
FIG. 3 is a sectional view taken along plane 3—3 in FIG. 2.
Figure 4:
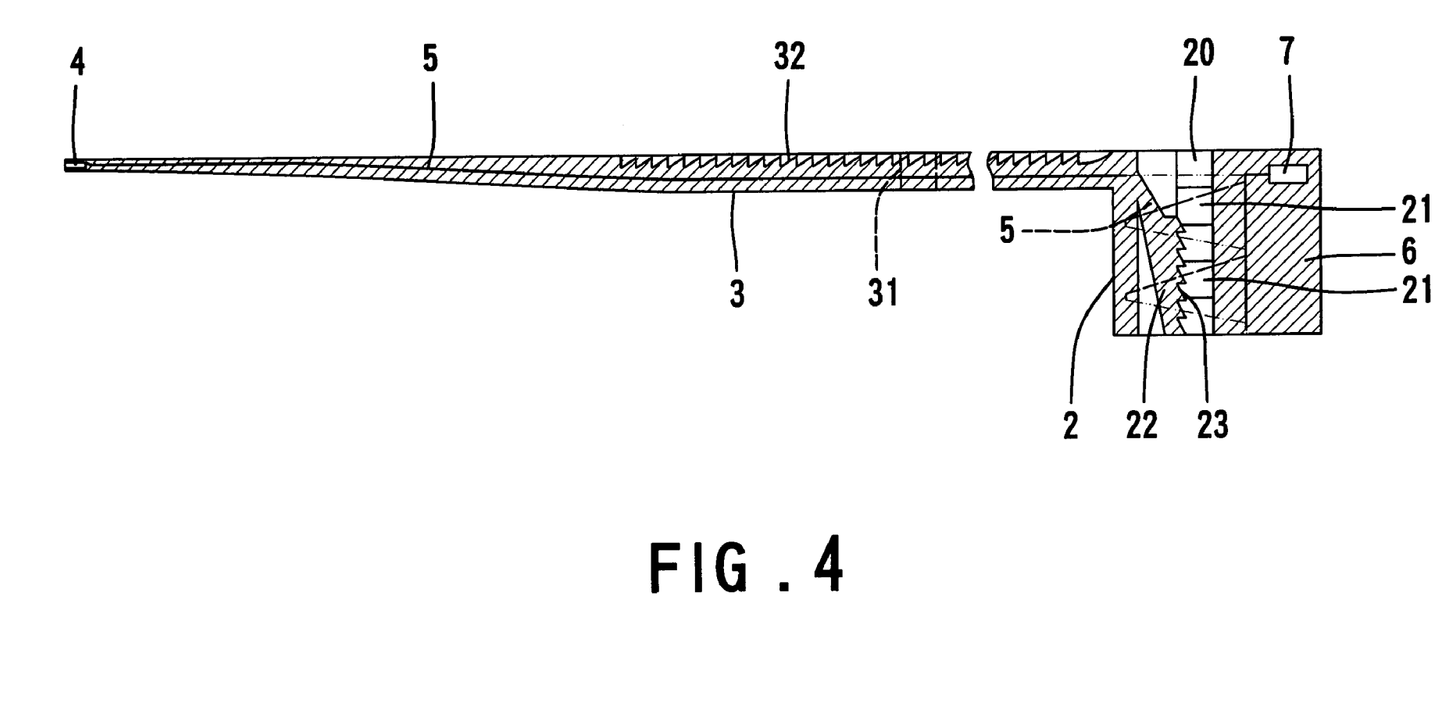
FIG. 4 is a sectional view taken along plane 4—4 in FIG. 2.

As illustrated in FIGS. 1, 3, and 4, the signal-transmitting line 5 extends around the through-hole 20 of the head 2. Preferably, the signal-transmitting line 5 extends helically in a perimeter wall delimiting the through-hole 20 of the head 2, which will be further described later. The strap 3, the head 2, and the protrusion 6 are preferably integrally formed of plastic materials by injection molding to cut the cost. Nevertheless, the strap 3, the head 2, and the protrusion 6 can be formed by other suitable methods.

The strap 3 includes an engaging member, e.g., a plurality of teeth 32 (preferably ratchet teeth) formed on a face of the strap 3. Further, the strap 3 includes at least one positioning member 31 on at least one of two lateral sides of the strap 3. In this embodiment, a positioning member 31 is formed on each lateral side of the strap 3.

Referring to FIG. 4, the head 2 also includes an engaging member for engaging with the engaging member of the strap 3. In this embodiment, a resilient tongue 22 extends from a wall delimiting the through-hole 20 of the head 2. A plurality of teeth 23 (preferably ratchet teeth) are formed on a side of the tongue 22 facing away from the wall from which the tongue 22 extends. Further, at least one positioning groove 21 is defined in at least one of another two mutually facing walls delimiting the through-hole 20 of the head 2. In this embodiment, two positioning grooves 21 (in the form of recesses) are defined in each of the mutually facing walls delimiting the through-hole 20 of the head 2, as illustrated in FIG. 3.

Figure 5:
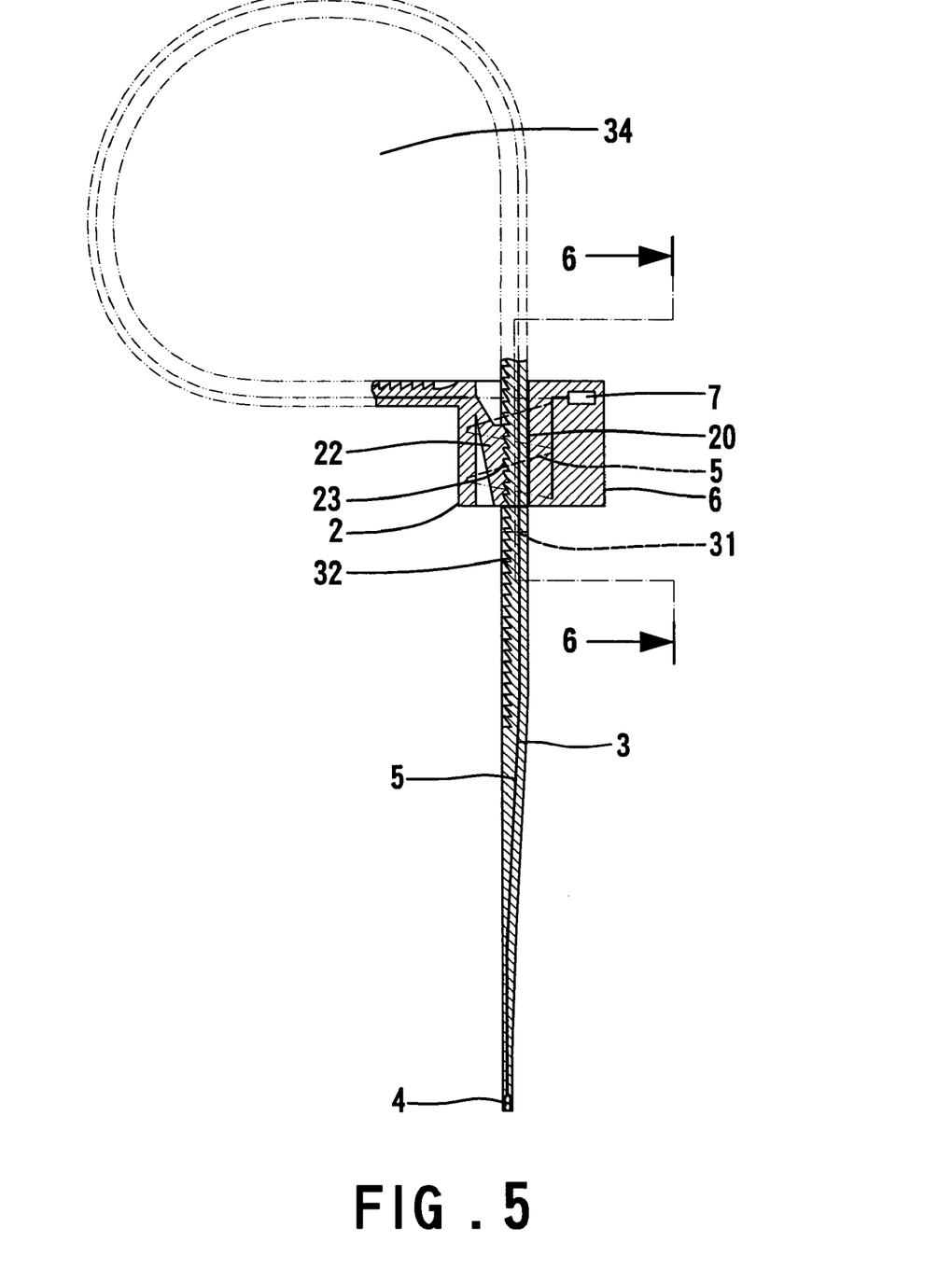
FIG. 5 is a sectional view illustrating use of the RFID electronic seal in FIG. 1.

FIG. 5 illustrates use of the RFID electronic seal 1. The strap 3 is passed through the through-hole 20 of the head 2 along a tightening direction, forming a tightening space 34 for tightening goods (not shown), such as an article, a parcel, or a plurality of articles or parcels. The teeth 32 on a portion of the strap 3 in the through-hole 20 of the strap 3 engages with the teeth 23 of the tongue 22, preventing the strap 3 from disengaging from the through-hole 20 of the head 2 along a reverse direction. Thus, once the RFID electronic seal 1 is in a tightening state, untying of the goods without breaking the RFID electronic seal 1 is impossible. Nevertheless, the owner of the goods will be aware of unauthorized breakage of the RFID electronic seal 1 after inspection. In other words, the owner may inspect intactness of the RFID electronic seal 1 after receiving the cargo.

Figure 6:
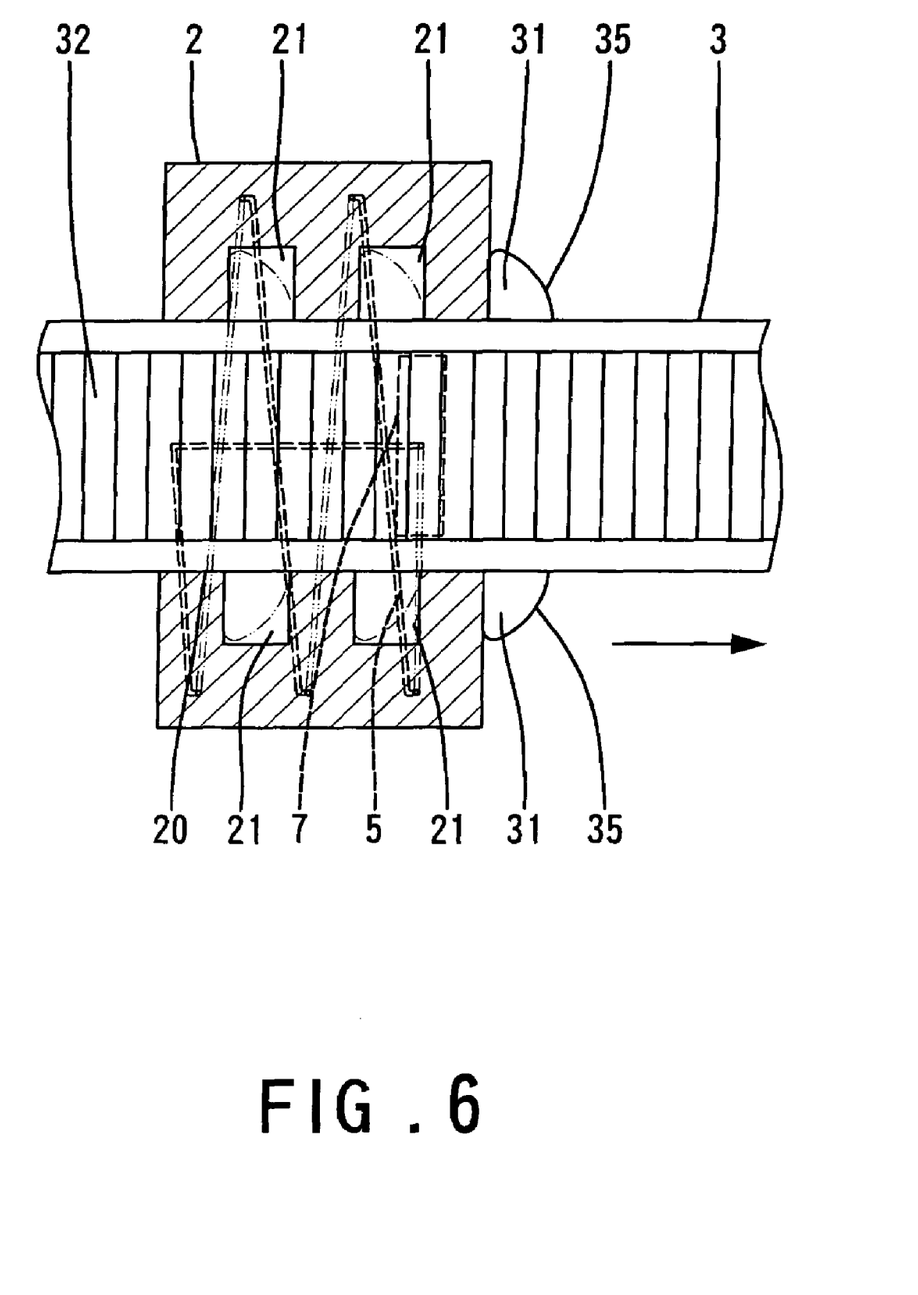
FIG. 6 is a view similar to FIG. 3, showing a tightening state of the RFID electronic seal.
Figure 13:
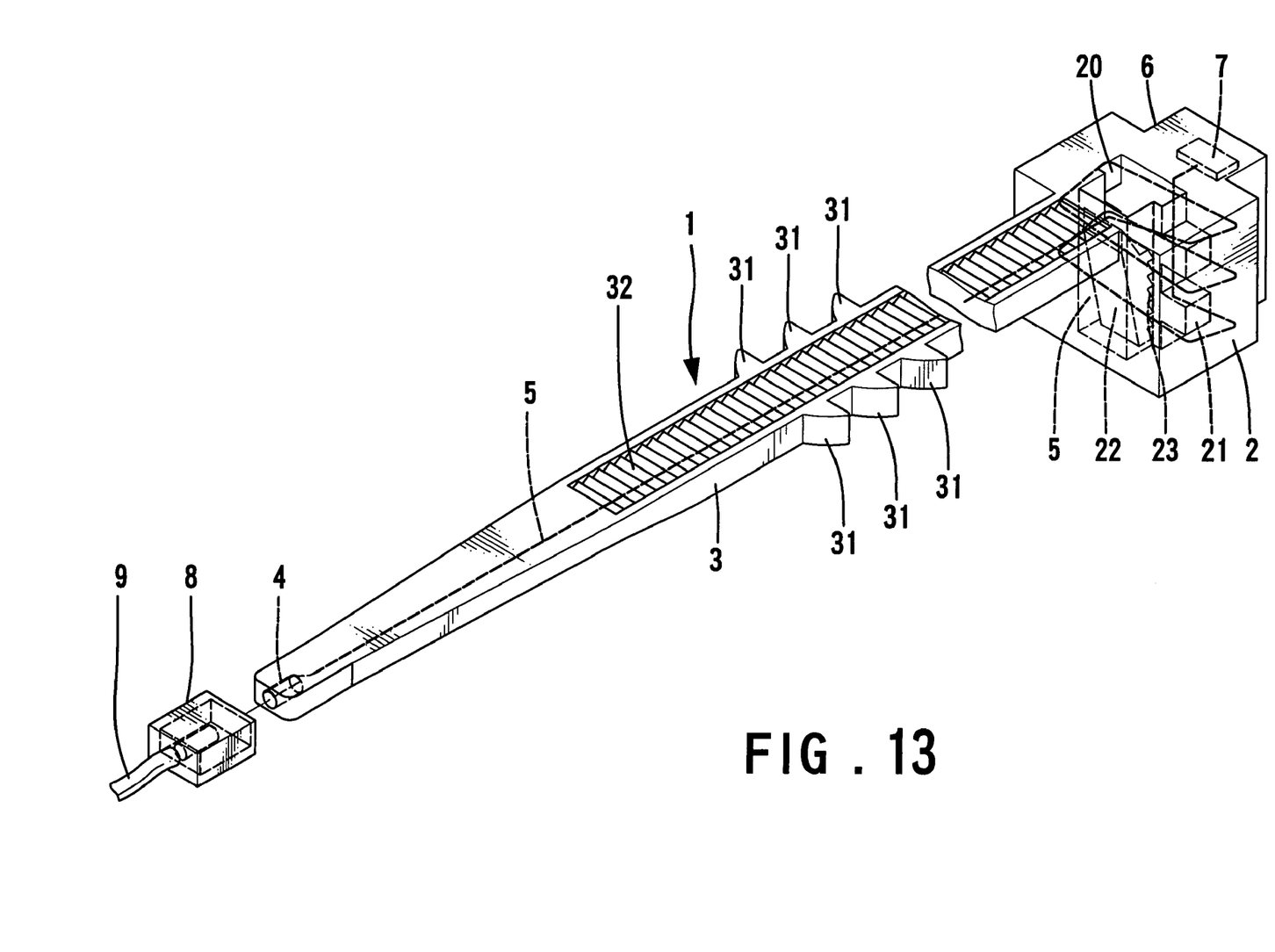
FIG. 13 is a perspective view illustrating a further modified embodiment of the RFID electronic seal in accordance with the present invention.

The positioning members 31 of the strap 3 and the positioning grooves 21 of the head 2 provide an additional tightening effect. As illustrated in FIG. 6, when the strap 3 is passed through the through-hole 20 of the head 20 along a tightening direction indicated by the arrow, the positioning members 31 pass from the first side of the head 2 through the positioning grooves 21 to the second side of the head 2. Each positioning member 31 includes an arcuate face 35 that allows smooth movement of the positioning member 31 from the first side of the head 2 to the second side of the head 2 and prevents movement of the positioning member 31 in the reverse (unfastening) direction. Thus, an attempt to move the strap 3 in a direction reverse to the arrow-indicated direction is impossible. Even if the positioning members 31 of the strap 3 are forcibly inserted into the head 2 along the reverse direction and, thus, engaged with a pair of the positioning grooves 21, an attempt of forcibly moving the positioning members 31 into another pair of positioning grooves 21 of the head 2 adjacent to the first side of the head 2 is impossible, even with tools. Thus, untying of the goods cannot be achieved without breakage of the RFID electronic seal 1. However, the owner of the goods will definitely be aware of such breakage. It is noted that when the positioning members 31 are engaged with the positioning grooves 21 of the head 2, the function of the RFID electronic seal 1 is not adversely affected as long as the RFID electronic seal 1 is in a tightened state. Further, as illustrated in FIG. 13, the number of the positioning members 31 can be increased for tightening goods of different sizes.

Figure 7:
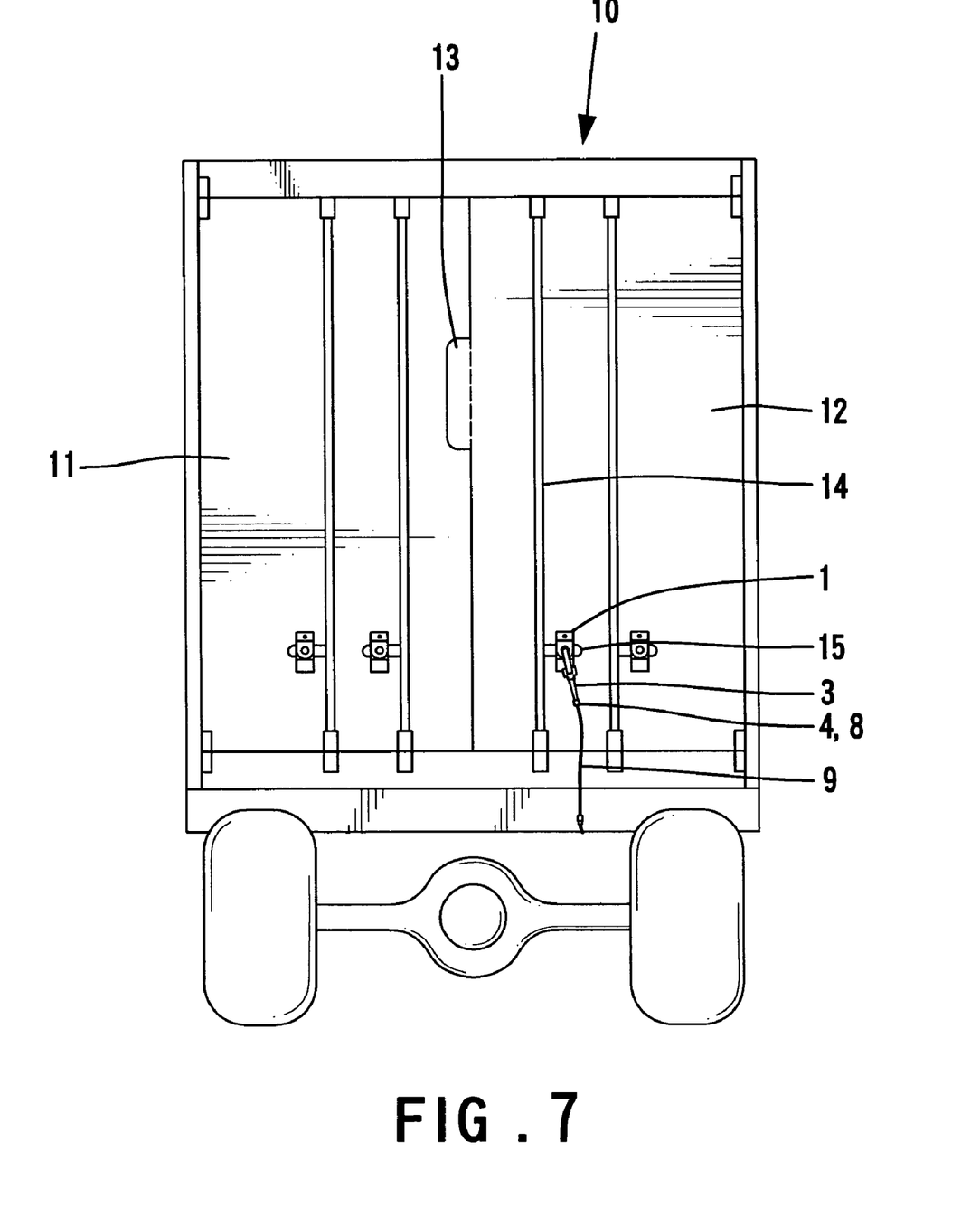
FIG. 7 is a schematic rear view of a cargo truck sealed with the RFID electronic seal in accordance with the present invention.
Figure 9:
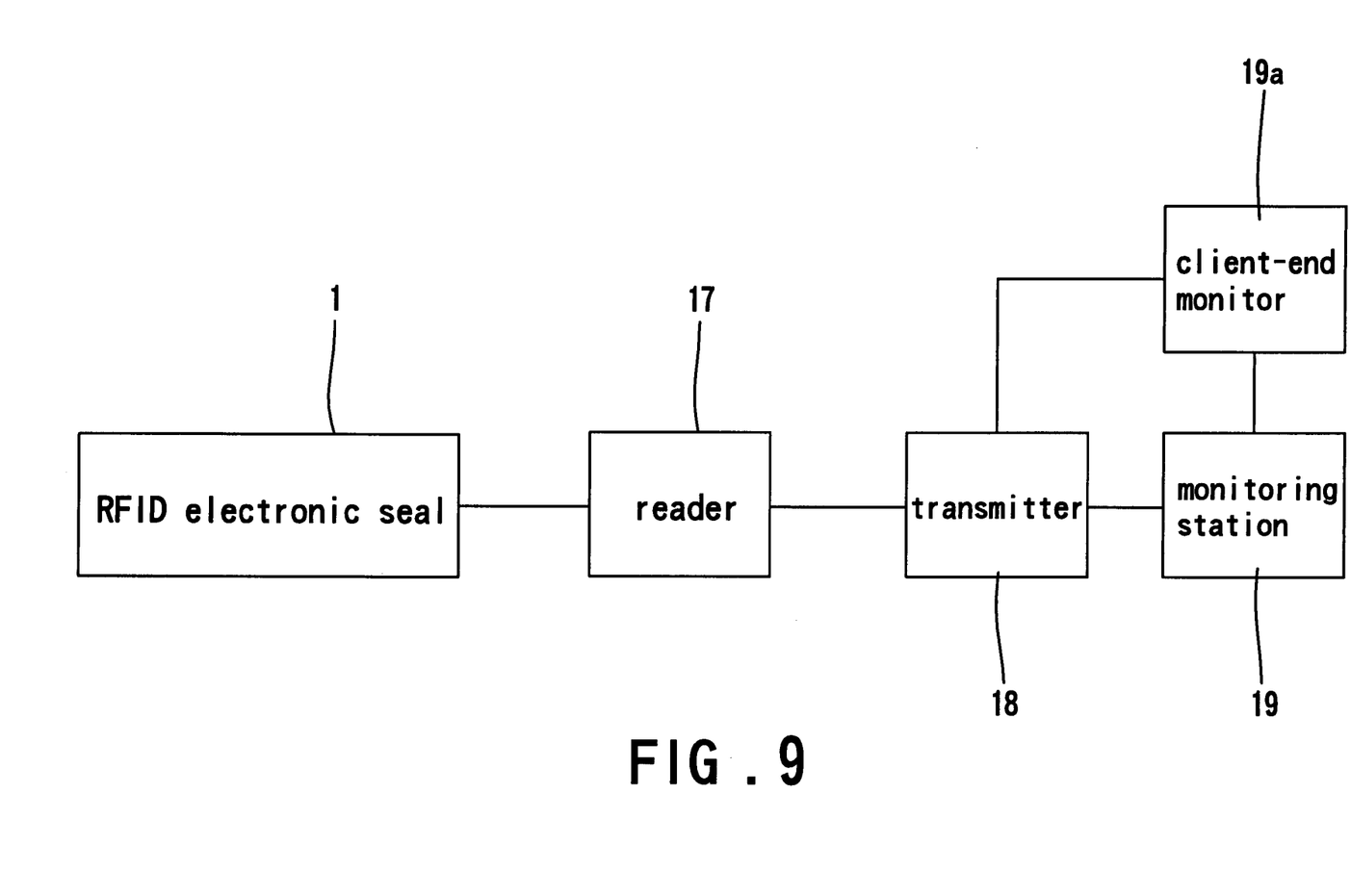
FIG. 9 is a schematic block diagram of a cargo tracking system in accordance with the present invention.

FIGS. 7 through 9 illustrate application of the RFID electronic seal 1 on a cargo container 10. A typical current cargo container 10 includes a left door 11 and a right door 12 having a stop 13 for preventing the left door 11 from pivoting outward. Thus, closing of the right door 12 is sufficient to close the cargo container 10. Two vertical rods 14 are pivotally mounted to each of the left door 11 and the right door 12. The doors 11 and 12 are closed when each vertical rod 14 is fixed. A horizontal rod 15 extends from each vertical rod 14 and includes a slot (not shown). A positioning plate (not shown) is formed on the right door 12 and includes a hole (not shown). Each vertical rod 14 is pivoted through an angle until the positioning plate extends through the slot of the the horizontal rod 15. The strap 3 of the RFID electronic seal 1 is passed through the hole of the positioning plate and the through-hole 20 of the head 2, forming a tightening space 34 to tighten the positioning plate. The cargo container 10 is thus sealed.

As illustrated in FIGS. 7 and 8, the connector 4 on the end of the RFID electronic seal 1 couples with a coupler 8 that is electrically connected via a wire 9 to a reader 17 in a cab 16 of the cargo truck, allowing transmission of data from the tag 7 to the reader 17. Preferably, the wire 9 extends along an underside of the cargo truck to avoid damage. The reader 17 is electrically connected to a transmitter 18 that transmits information containing the data received from the tag 7 via the wire 9 as well as position and details of the cargo truck to a monitoring station 19 (of a customer or the cargo owner) and/or a client-end monitor 19a. Of course, the information may be directly transmitted from the transmitter 8 to the client-end monitor 19a. Thus, the location of the cargo truck is known in real time. As illustrated in FIG. 9, since the signal-transmitting line 5 (a signal line in this example) is embedded in an insulating material such as plastics, the signal transmission between the reader 17 and the tag 7 is not adversely affected. Further, the wire connection between the reader 17 and the tag 7 assures reliable signal transmission even if the relative position between the reader 17 and the tag 7 is altered.

In a case that the RFID electronic seal 1 is broken, the signal-transmitting line 5 is broken, too. The reader 17 could not receive signals from the tag 7. Information of this condition is immediately transmitted by the transmitter 18 to the monitoring station 19 and/or the client-end monitor 19a. Thus, the monitoring station 19 and/or the client end will be informed of unauthorized breakage of the RFID electronic seal 1 in real time and take necessary actions. A reliable cargo tracking system is thus provided. It is noted that the signal-transmitting line 5 will be broken to cause interruption of signal transmission regardless of the means (e.g., severing) to break the RFID electronic seal 1 along any direction. This is because the signal-transmitting line 5 extends helically in the perimeter wall delimiting the through-hole 20 of the head 2. Any attempt to break the head 2 via the perimeter wall delimiting the through-hole 20 for unfastening the RFID electronic seal 1 will inevitably sever the signal-transmitting line 5.

It is noted that the RFID electronic seal 1 can be used with other types of cargo containers.

The transmitter 18 can be a transmitter for GPS (global positioning system), a PDA (personal digital assistant), or a cellular phone of a mobile phone system (such as GSM). Further, the transmitter 18 and the reader 17 can be incorporated as a single unit, if desired.

Figure 10:
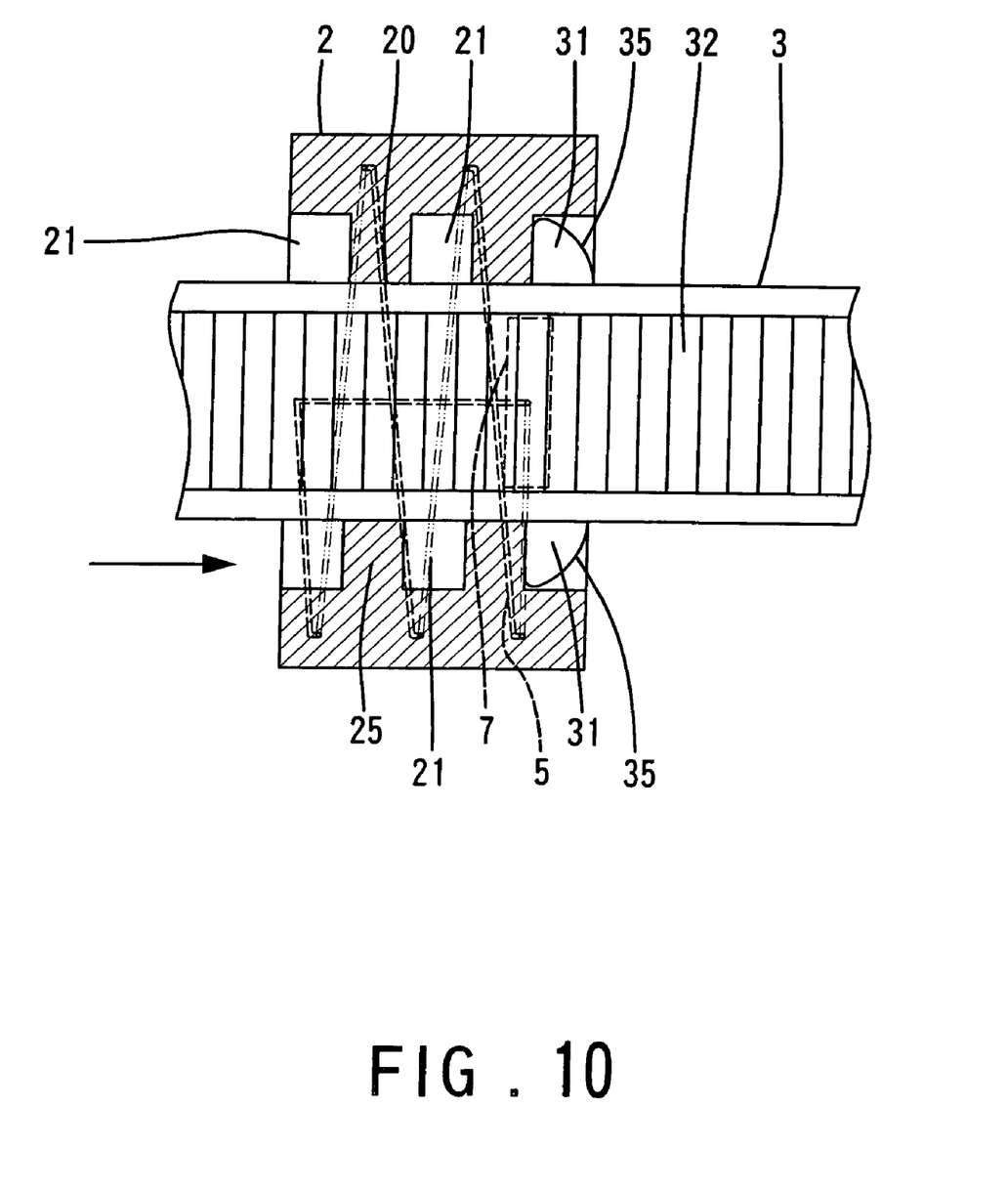
FIG. 10 is a view similar to FIG. 6, illustrating a modified embodiment of the RFID electronic seal in accordance with the present invention.

FIG. 10 illustrates a modified embodiment of the invention, wherein the mutually facing walls delimiting the through-hole 20 of the head 2 includes at least one protrusion 25 to form at least two positioning grooves 21. In this embodiment, two protrusions 25 are formed on each of the mutually facing walls delimiting the through-hole 20 of the head 2, forming three positioning grooves 21. Function of the RFID electronic seal 1 in this embodiment is substantially the same as that of the first embodiment. It is noted that the strap 3 with more positioning members 31 shown in FIG. 13 for various tightening spaces 34 can be used in this embodiment.

Figure 11:
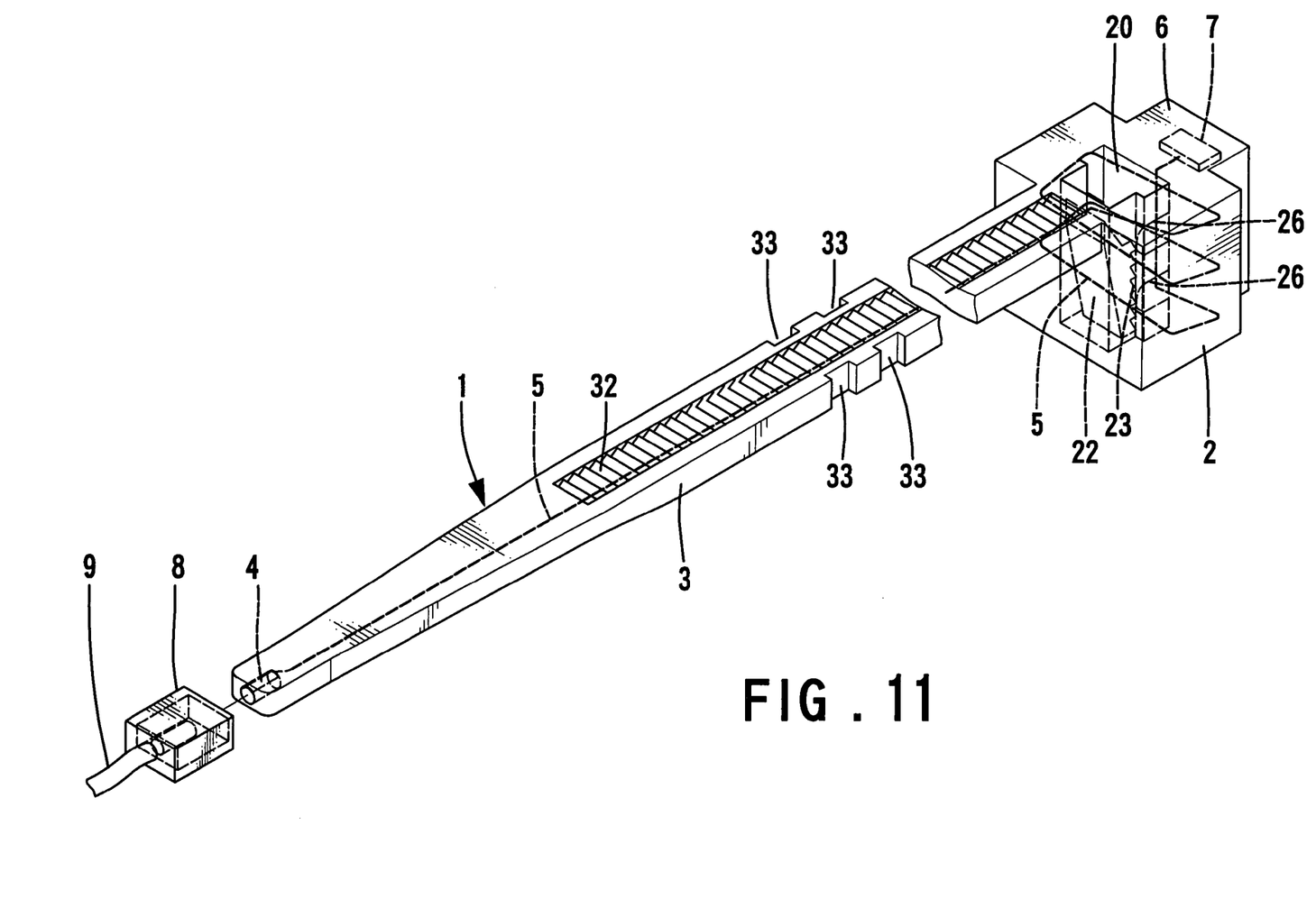
FIG. 11 is a perspective view illustrating another modified embodiment of the RFID electronic seal in accordance with the present invention.
Figure 12:
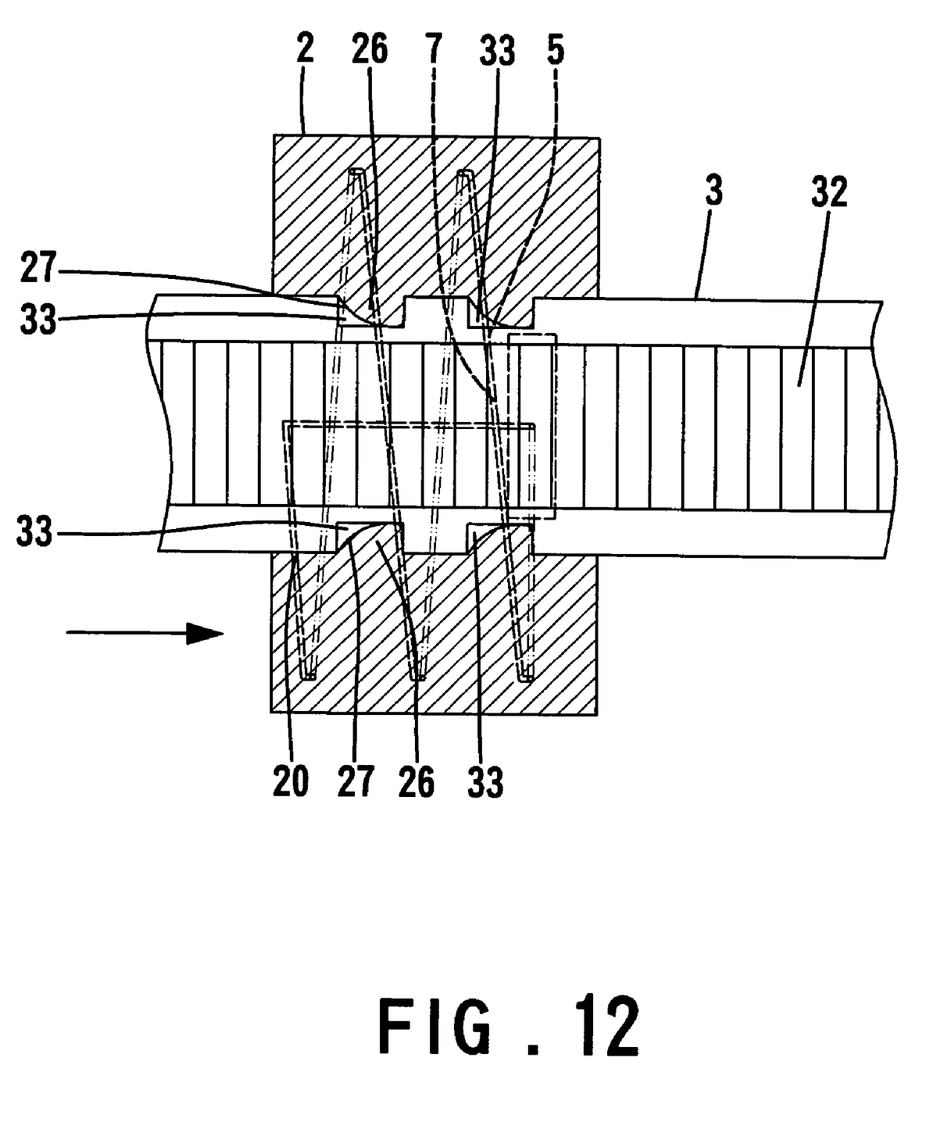
FIG. 12 is a sectional view similar to FIG. 6, illustrating tightening of the RFID in FIG. 11.

FIGS. 11 and 12 illustrate another modified embodiment of the invention, wherein at least one of the mutually facing walls delimiting the through-hole 20 of the head 2 includes at least one positioning member 26 (in the form of protrusions) having an arcuate face 27, and at least one positioning groove 33 is defined in at least one of the lateral sides of the strap 3. In this embodiment, each of the mutually facing walls delimiting the through-hole 20 of the head 2 includes two positioning members 26 each having an arcuate face 27, and two positioning grooves 33 are defined in at least one of the lateral sides of the strap 3. Function of the RFID electronic seal 1 in this embodiment is substantially the same as that of the first embodiment. It is noted that the strap 3 with more positioning members 31 shown in FIG. 13 for various tightening spaces can be used in this embodiment.

The connector 4 and the coupler 8 are illustrated for explanation only, not to limit the invention. The connector 4 formed on the second end of the strap 3 can be of any desired type, and the coupler 8 can be of any suitable one for coupling with the connector 4. Further, the coupler 8 and the connector 4 can be omitted, which still allows wireless signal transmission when cases apply.

In a case that the RFID electronic seal 1 is not used for tracking cargo or goods, the signal-transmitting line 5 does not have to extend helically in the perimeter wall delimiting the through-hole 20 of the head 2. This is because the most important thing amongst others for the owner of the cargo or goods is to inspect intactness of the RFID electronic seal 1 after receiving the cargo or goods.

Further, the tag 7 may be embedded in a place other than the protrusion 6. The protrusion 6 can be omitted, and the tag 7 is embedded in the head 2 without adversely affecting the function of the RFID electronic seal 1.

The tongues 22, teeth 23, positioning grooves 21, protrusions 25, and positioning members 26 of the head 2 and the teeth 32, positioning grooves 33 of the strap 3 can be replaced with other equivalent arrangements.

Further, it is noted that the cargo tracking systems is not limited to cargo trucks. The RFID electronic seal 1 in accordance with the present invention can be used with any cargo or goods carrier, such as cargo trucks, motorcycles, cars, airplanes, etc. The cargo or goods sealed and/or tightened by the RFID electronic seal is coupled with a reader via wire or wireless connection, and information containing data of the cargo or goods as well as the location and details of the cargo or goods carrier can be transmitted via a transmitter on the cargo or goods carrier, allowing the owner of the cargo or goods to track the cargo or goods in real time.

Figure 14:
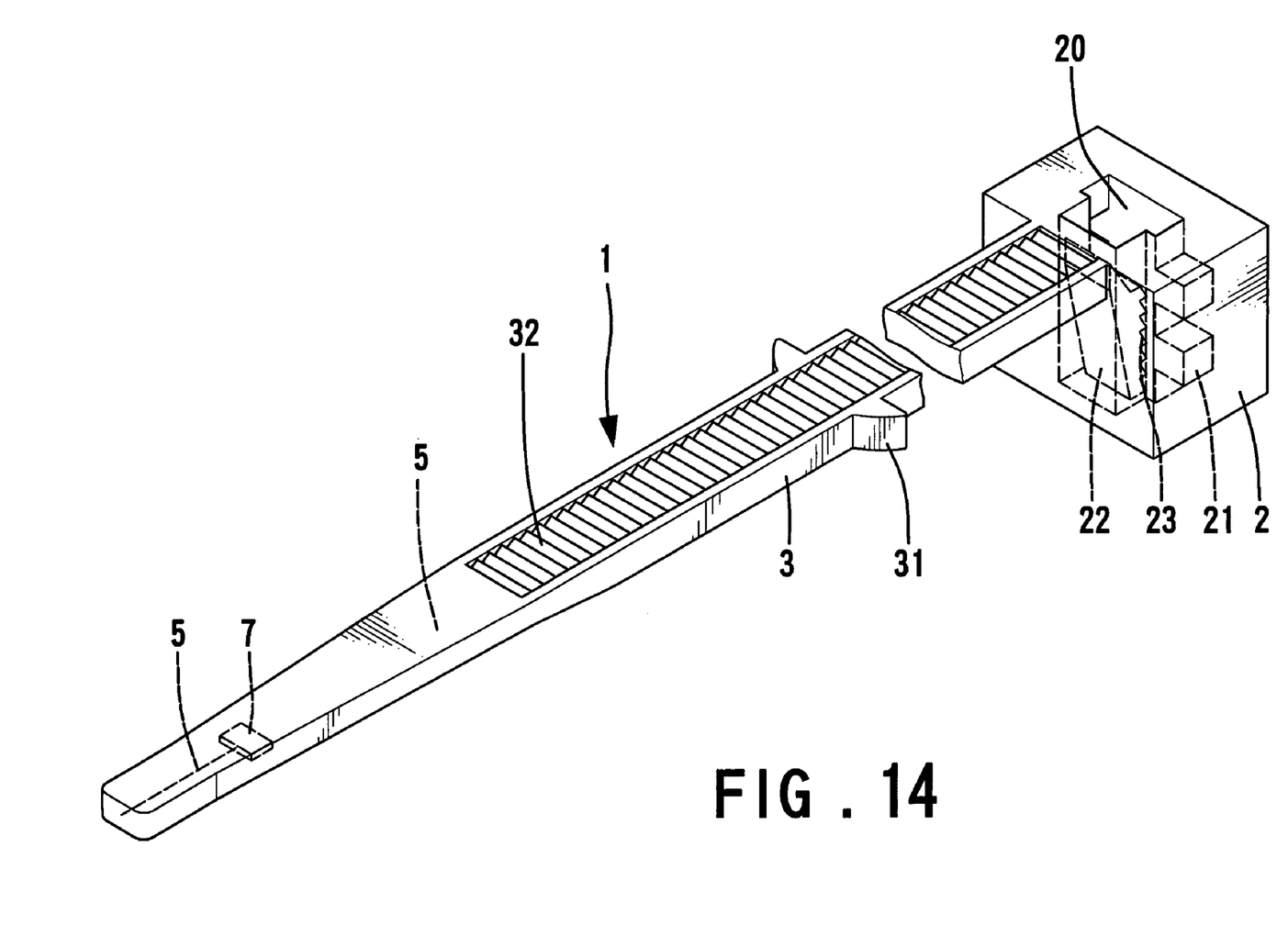
FIG. 14 is a perspective view illustrating still another modified embodiment of the RFID electronic seal in accordance with the present invention.

FIG. 14 illustrates another modified embodiment of the invention, the protrusion 6 and the connector 4 are omitted. Further, the tag 7 is embedded in the strap 3 in a location adjacent to the second end of the strap 3. The overall length of the signal-transmitting line 5 is thus relatively short, saving the cost. It is noted that the embodiments of FIGS. 6, 10, 11, and 13 can be incorporated with the arrangement shown in FIG. 14.

Although specific embodiments have been illustrated and described, numerous modifications and variations are still possible without departing from the essence of the invention. The scope of the invention is limited by the accompanying claims.

What is claimed is:

1. An electronic seal comprising:
   a head comprising a first side and a second side facing away from the first side, a through-hole extending from the first side through the second side of the head, the head including a first engaging member, the head further including a first end and a second end;
   a strap including a first end extending from the first end of the head and a second end, the strap including a second engaging member;
   a tag embedded in the second end of the head; and
   a signal-transmitting line embedded in the tag and the strap and extending from the tag through a perimeter wall delimiting the through-hole of the head and surrounding the through-hole of the head and then extending from the first end of the strap through the second end of the strap;
   the strap being extendable through the through-hole of the head along a tightening direction, forming a tightening space, with the first engaging member engaging with the second engaging member to prevent the strap from moving in an unfastening direction reverse to the tightening direction.

2. The electronic seal as claimed in claim 1, wherein the strap further includes at least one positioning member on at least one of two lateral side of the strap, at least one of another two mutually facing walls delimiting the through-hole of the head including at least one positioning groove, said at least one positioning member being positioned in one of said at least one positioning groove and the second side of the head.

3. The electronic seal as claimed in claim 2, wherein said at least one of another two mutually facing walls delimiting the through-hole of the head includes a recess to form said at least one positioning groove.

4. The electronic seal as claimed in claim 2, wherein said at least one of another two mutually facing walls delimiting the through-hole of the head includes a protrusion to form said at least one positioning groove.

5. The electronic seal as claimed in claim 3, wherein said at least one positioning member includes an arcuate face to allow smooth movement of the strap along the tightening direction and to prevent the strap from moving along the unfastening direction.

6. The electronic seal as claimed in claim 4, wherein said at least one positioning member includes an arcuate face to allow smooth movement of the strap along the tightening direction and to prevent the strap from moving along the unfastening direction.

7. The electronic seal as claimed in claim 1, wherein the signal-transmitting line extends helically in the perimeter wall delimiting the through-hole of the head.

8. The electronic seal as claimed in claim 1, wherein the signal-transmitting line is a signal line having a connector coupled to a distal end thereof.

9. The electronic seal as claimed in claim 1, wherein the strap includes at least one positioning groove in at least one of two lateral sides of the strap, at least one of two mutually facing walls delimiting the through-hole of the strap including at least one positioning member for engaging with said at least one positioning groove.

10. A tracking system comprising:
    a carrier carrying a cargo or goods;
    an electronic seal sealing the cargo or tightening the goods, the electronic seal comprising:
    a head comprising a first side and a second side facing away from the first side, a through-hole extending from the first side through the second side of the head, the head including a first engaging member, the head further including a first end and a second end;
    a strap including a first end extending from the first end of the head and a second end, the strap including a second engaging member;
    a tag embedded in the second end of the head; and
    a signal-transmitting line embedded in the head and the strap and extending from the tag through a perimeter wall delimiting the through-hole of the head and surrounding the through-hole of the head and then extending from the first end of the strap through the second end of the strap;
    the strap being extendable through the through-hole of the head along a tightening direction, forming a tightening space, with the first engaging member engaging with the second engaging member to prevent the strap from moving in an unfastening direction reverse to the tightening direction.
    a reader mounted on the carrier;
    a monitoring station; and
    a transmitter electrically connected to the reader for transmitting data from the tag to the monitoring station.

11. The tracking system as claimed in claim 10, wherein the signal-transmitting line is an antenna and wherein the reader is located within an effective transmission range of the antenna.

12. The tracking system as claimed in claim 10, wherein the signal-transmitting line is a signal line connected to the reader via a wire.

13. The tracking system as claimed in claim 10, wherein the reader and the transmitter are incorporated as a single unit.

14. The tracking system as claimed in claim 10, wherein the transmitter is one of a transmitter for global positioning system, a personal digital assistant, and a cellar phone of a mobile phone system.

15. The tracking system as claimed in claim 12, wherein the transmitter transmits information containing location of the carrier to the monitoring station.

16. The tracking system as claimed in claim 11, wherein the transmitter transmits information containing location of the carrier to the monitoring station.

17. The tracking system as claimed in claim 10, wherein the tracking system further includes a client-end monitor connected to at least one of the transmitter and the monitoring station.

18. The tracking system as claimed in claim 10, wherein the signal-transmitting line extends helically in the perimeter wall delimiting the through-hole of the head.

19. A tracking system comprising:
  a carrier carrying a metal container, the carrier being located in front of the metal container;
  an electronic seal sealing a rear of the metal container, the electronic seal comprising:
    a head comprising a first side and a second side facing away from the first side, a trough-hole extending from the first side through the second side of the head, the head including a first engaging member;
    a strap including a first end extending from the head and a second end, the strap including a second engaging member;
    a tag embedded in the head; and
    a signal line embedded in the head and extending from the tag through the first end of the strap to the second end of the strap;
    the strap being extendable trough the through-hole of the head along a tightening direction, forming a tightening space, with the first engaging member engaging with the second engaging member to prevent the strap from moving in an unfastening direction reverse to the tightening direction.
  a reader mounted on the carrier, the reader being connected by a wire to the signal line of the electronic seal;
  a monitoring station; and
  a transmitter electrically connected to the reader for transmitting data from the tag to the monitoring station.

20. The tracking system as claimed in claim 19, wherein the transmitter is one of a transmitter for global positioning system, a personal digital assistant, and a cellar phone of a mobile phone system.

21. The tracking system as claimed in claim 19, wherein the transmitter transmits information containing location of the carrier to the monitoring station.

22. The tracking system as claimed in claim 19, wherein the tracking system further includes a client-end monitor connected to at least one of the transmitter and the monitoring station.

23. The tracking system as claimed in claim 19, wherein the signal line extends helically in the perimeter wall delimiting the through-hole of the head.

* * * * *